Sept. 2, 1924.
H. ERFLE
1,507,111
LENS SYSTEM FOR GALILEAN TELESCOPES
Filed Dec. 6, 1923
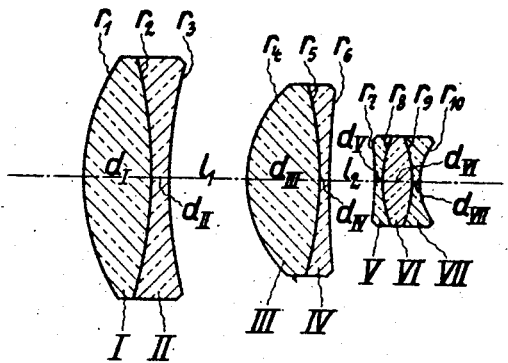
Inventor:
Heinrich Erfle
per Ilse Erfle
Administratrix Patented Sept. 2, 1924.

1,507,111

UNITED STATES PATENT OFFICE.

HEINRICH ERFLE, DECEASED, LATE OF JENA, GERMANY; BY ILSE ERFLE, OF JENA, GERMANY, ADMINISTRATRIX, ASSIGNOR TO THE FIRM OF CARL ZEISS, OF JENA, GERMANY.

LENS SYSTEM FOR GALILEAN TELESCOPES.

Application filed December 6, 1923. Serial No. 678,985.

*To all whom it may concern:*

Be it known that HEINRICH ERFLE, late a citizen of Germany, has invented a new and useful Lens System for Galilean Telescopes (for which an application has been filed in Germany December 9, 1922), of which the following is a specification.

With the lens systems hitherto used for Galilean telescopes the elimination of the image defects was generally confined to the removal of the chromatic longitudinal aberration and the chromatic difference in magnification as well as to the elimination of the astigmatism for a certain definite locus of the eye. However, the elimination of the coma and consequently a faultless image outside the axis can only be attained by simultaneously eliminating for the whole telescope the spherical longitudinal aberration and the condition of sine. These requirements are to be satisfied by the present invention by which it is further attained that the astigmatic difference does not depend any more so largely from the locus of the eye, as such has been the case in the Galilean telescopes hitherto known.

The object strived for can be attained by making the objective consist of two collective members, each of which is composed of two cemented lenses, of which the one having the lower refractive index is facing the incident light, and by composing the ocular of three cemented lenses, the inner one being a flint lens.

The annexed drawing represents a constructional example of a Galilean telescope having a triple magnification in a section. The focal length of the objective is 28.75, its aperture 1:1.2 and the ocular focal length —9.58. In the constructional example there is still a negative, chromatic difference in magnification which could be easily removed by suitably altering the radii. The refractive indices $n_D$ for the D line of the solar spectrum and the values of the dispersion $\gamma$ for the kinds of glass used as well as the radii $r$ of the refractive surfaces, the thicknesses $d$ of the lenses and the distances $l$ of the optical members are given in the subjoined table.

*Kinds of glass.*

$n_{D\ I} = 1{,}5163$  $\gamma_I = 64.0$
$n_{D\ II} = 1{,}6489$  $\gamma_{II} = 33.8$
$n_{D\ III} = 1{,}5163$  $\gamma_{III} = 64.0$
$n_{D\ IV} = 1{,}6489$  $\gamma_{IV} = 33.8$
$n_{D\ V} = 1{,}6098$  $\gamma_V = 58.8$
$n_{D\ VI} = 1{,}6489$  $\gamma_{VI} = 33.8$
$n_{D\ VII} = 1{,}6089$  $\gamma_{VII} = 58.8$

*Radii, thicknesses and distances.*

$r_1 = +21{,}509$
$r_2 = -44{,}735$  $d_I = 6.8$
$r_3 = +44{,}735$  $d_{II} = 1.8$
$r_4 = +12{,}721$  $l_1 = 7.9$
$r_5 = -35{,}348$  $d_{III} = 7.3$
$r_6 = +90{,}040$  $d_{IV} = 1.0$
$r_7 = -38{,}910$  $l_2 = 4.6$
$r_8 = +11{,}890$  $d_V = 0.8$
$r_9 = -11{,}890$  $d_{VI} = 3.8$
$r_{10} = + 6{,}613$  $d_{VII} = 0.8$

*Claim.*

In a lens system for Galilean telescopes an objective consisting of two collective members each cemented in two parts, in each of which members the lens having the lower refractive index is facing the incident light, and a dispersive ocular cemented in three parts, the inner lens of this ocular being a flint lens.

ILSE ERFLE.

*Administratrix of the Estate of Heinrich Erfle.*